US 12,403,657 B2

(12) United States Patent
Teramoto et al.

(10) Patent No.: US 12,403,657 B2
(45) Date of Patent: Sep. 2, 2025

(54) THREE-DIMENSIONAL SHAPING DEVICE

(71) Applicant: SEIKO EPSON CORPORATION, Tokyo (JP)

(72) Inventors: Tatsuya Teramoto, Nagano (JP); Taki Hashimoto, Nagano (JP); Kazuhide Nakamura, Asahi-mura (JP); Masayuki Gozu, Nagano (JP); Takafumi Sameshima, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/157,888

(22) Filed: Jan. 23, 2023

(65) Prior Publication Data

US 2023/0234288 A1  Jul. 27, 2023

(30) Foreign Application Priority Data

Jan. 24, 2022  (JP) ................................. 2022-008462

(51) Int. Cl.
| | | |
|---|---|---|
| *B33Y 30/00* | (2015.01) | |
| *B29C 64/245* | (2017.01) | |
| *B29C 64/295* | (2017.01) | |
| *B29C 64/393* | (2017.01) | |
| *B33Y 50/02* | (2015.01) | |

(52) U.S. Cl.
CPC .......... *B29C 64/295* (2017.08); *B29C 64/245* (2017.08); *B29C 64/393* (2017.08); *B33Y 30/00* (2014.12); *B33Y 50/02* (2014.12)

(58) Field of Classification Search
None
See application file for complete search history.

(56) References Cited

U.S. PATENT DOCUMENTS

| | | | | |
|---|---|---|---|---|
| 2016/0144564 | A1* | 5/2016 | Padgett | B29C 64/209 |
| | | | | 425/113 |
| 2017/0355137 | A1* | 12/2017 | Ederer | B29C 64/165 |
| 2018/0200955 | A1* | 7/2018 | Hoelldorfer | B33Y 30/00 |
| 2019/0134913 | A1* | 5/2019 | Buratto | B29C 64/245 |
| 2020/0039140 | A1* | 2/2020 | You | B29C 64/245 |
| 2020/0215756 | A1* | 7/2020 | Hagiwara | B22F 10/31 |
| 2020/0398494 | A1* | 12/2020 | Cambron | B29C 64/205 |
| 2020/0406548 | A1* | 12/2020 | Yuwaki | B29C 64/106 |
| 2021/0387401 | A1* | 12/2021 | Rumjahn | B29C 64/295 |

FOREIGN PATENT DOCUMENTS

| | | |
|---|---|---|
| JP | 2006-192710 A | 7/2006 |
| JP | 2014-1846796 A | 10/2014 |
| JP | 2019-064090 A | 4/2019 |

* cited by examiner

*Primary Examiner* — Yung-Sheng M Tsui
(74) *Attorney, Agent, or Firm* — Global IP Counselors, LLP

(57) ABSTRACT

A three-dimensional shaping device includes: a discharge part that includes a nozzle configured to discharge a shaping material from a nozzle opening thereof; a stage that includes a shaping surface on which the shaping material is to be deposited; a heating part configured to heat the shaping material deposited on the stage; and a control part configured to control the heating part. The heating part includes a first region and a second region closer to an outer periphery of the heating part than is the first region, as viewed from a direction of a perpendicular line of the shaping surface. The control part controls the heating part to make a temperature of the second region higher than a temperature of the first region.

6 Claims, 8 Drawing Sheets

THREE-DIMENSIONAL SHAPING DEVICE

The present application is based on, and claims priority from JP Application Serial Number 2022-008462, filed Jan. 24, 2022, the disclosure of which is hereby incorporated by reference herein in its entirety.

BACKGROUND

1. Technical Field

The present disclosure relates to a three-dimensional shaping device.

2. Related Art

There is known a three-dimensional shaping device that shapes a three-dimensional shaped object by discharging and laminating a plasticized material and curing the material.

For example, JP-A-2006-192710 discloses a method for producing a three-dimensional object by extruding a thermoplastic material, which is melted by being heated by a preheater, into a specific region on a base from an extrusion nozzle that performs scanning according to preset shape data, and further laminating the melted material on the material cured on the base.

As described above, when a three-dimensional object is formed by laminating materials, the materials laminated on a base contract due to being cooled down, and thus warpage or deformation occurs in the laminated materials, which may affect the shaping accuracy. In particular, the materials laminated on an outer peripheral side of the base are easily cooled down, and thus are likely to be warped or deformed.

SUMMARY

One aspect of a three-dimensional shaping device according to the present disclosure includes: a discharge part that includes a nozzle configured to discharge a shaping material from a nozzle opening thereof; a stage that includes a shaping surface on which the shaping material is to be deposited; a heating part configured to heat the shaping material deposited on the stage; and a control part configured to control the heating part, the heating part includes a first region and a second region closer to an outer periphery of the heating part than is the first region, as viewed from a direction of a perpendicular line of the shaping surface, and the control part controls the heating part to make a temperature of the second region higher than a temperature of the first region.

DESCRIPTION OF EXEMPLARY EMBODIMENTS

Hereinafter, preferred embodiments of the present disclosure will be described in detail with reference to the drawings. The embodiments described below do not unduly limit contents of the present disclosure described in the claims. Further, all of configurations to be described below are not necessarily essential elements of the present disclosure.

1. First Embodiment

1.1. Three-Dimensional Shaping Device

1.1.1. Overall Configuration

Figure 1:
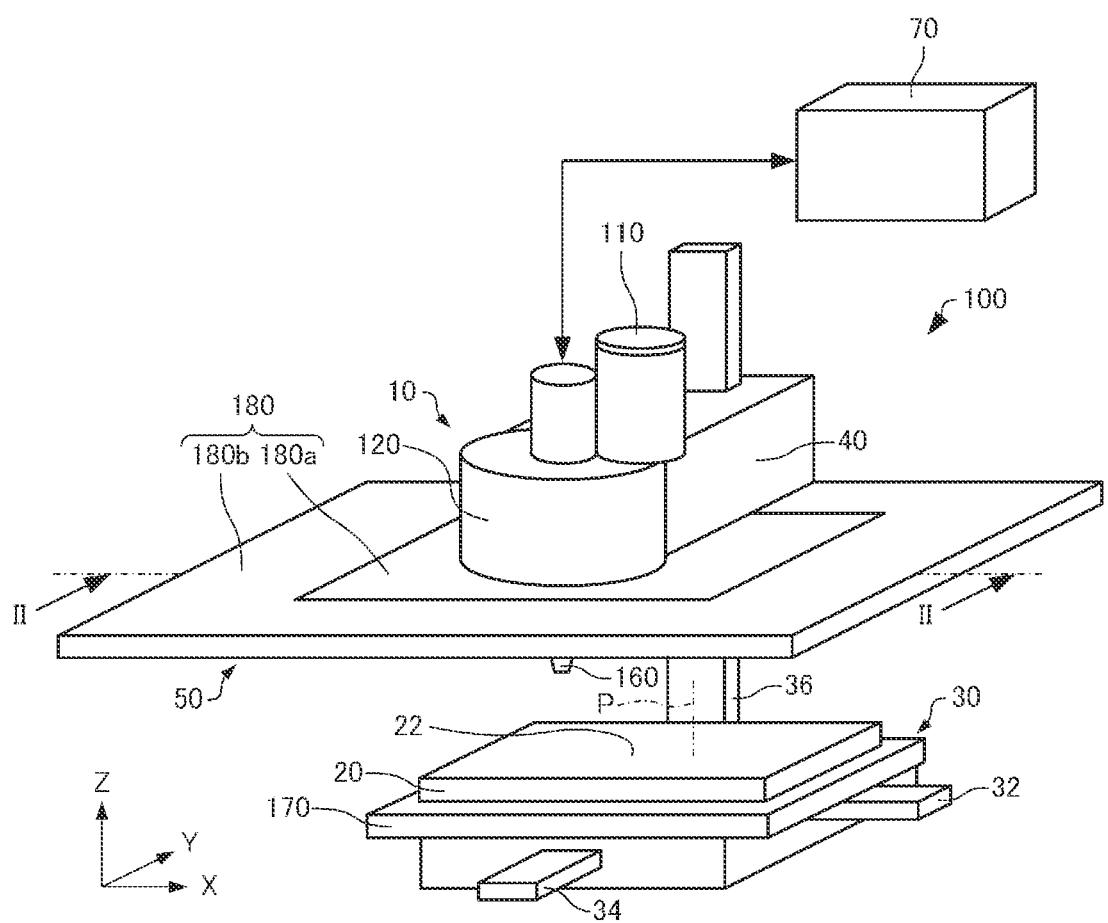
FIG. 1 is a perspective view schematically illustrating a three-dimensional shaping device according to a first embodiment.
Figure 2:
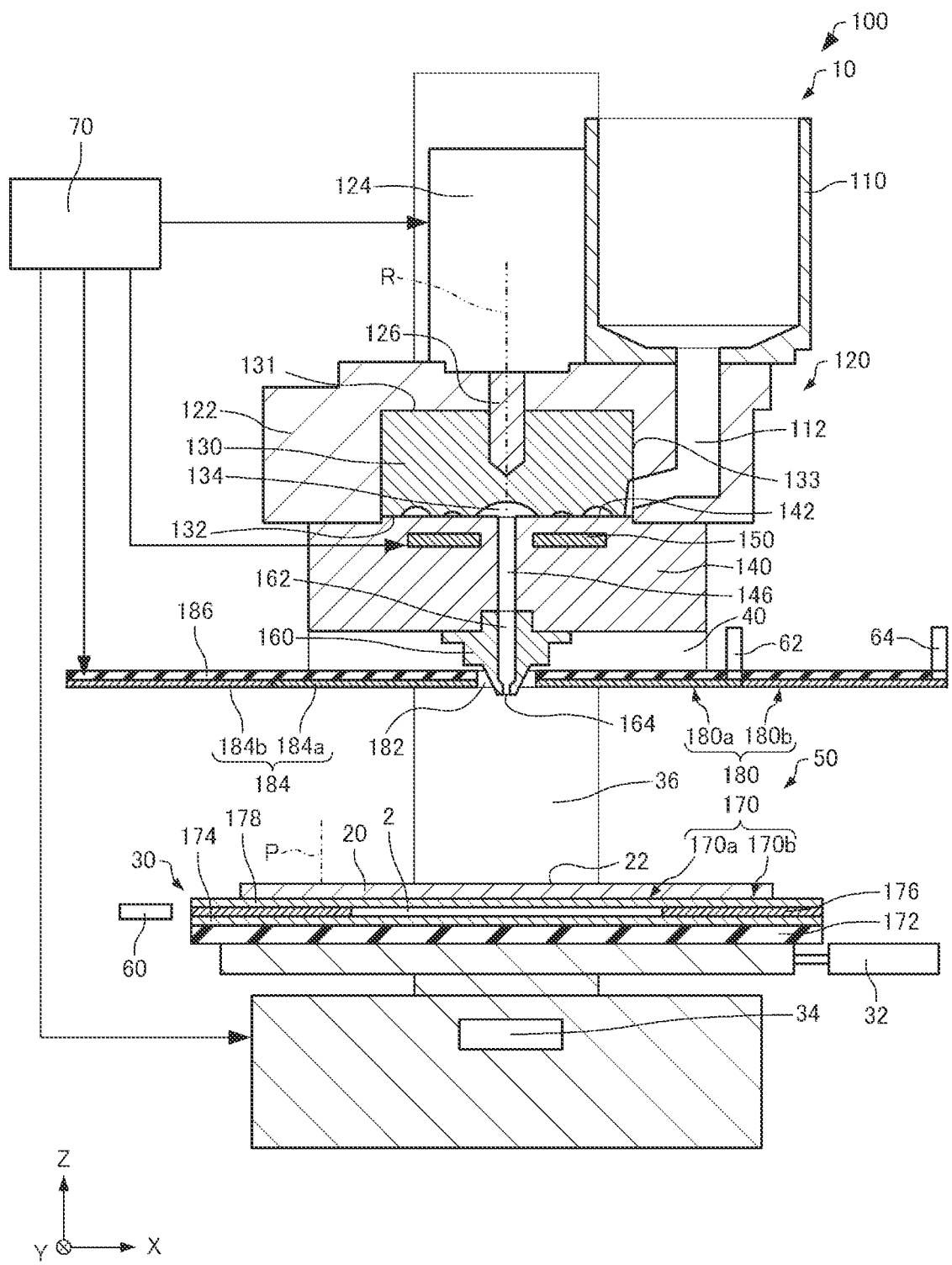
FIG. 2 is a cross-sectional view schematically illustrating the three-dimensional shaping device according to the first embodiment.

First, a three-dimensional shaping device according to a first embodiment will be described with reference to the drawings. FIG. 1 is a perspective view schematically illustrating a three-dimensional shaping device 100 according to the first embodiment. FIG. 2 is a cross-sectional view taken along a line II-II in FIG. 1, schematically illustrating the three-dimensional shaping device 100 according to the first embodiment.

In FIGS. 1 and 2, an X axis, a Y axis, and a Z axis are shown as three axes orthogonal to one another. An X-axis direction and a Y-axis direction are, for example, horizontal directions. A Z-axis direction is, for example, a vertical direction.

As illustrated in FIGS. 1 and 2, the three-dimensional shaping device 100 includes, for example, a discharge part 10, a stage 20, a moving mechanism 30, a support member 40, a heating part 50, a first temperature sensor 60, a second temperature sensor 62, a third temperature sensor 64, and a control part 70. For convenience, illustration of the temperature sensors 60, 62, and 64 is omitted in FIG. 1.

The three-dimensional shaping device 100 drives the moving mechanism 30 to change a relative position between the discharge part 10 and the stage 20 while discharging a plasticized shaping material from the discharge part 10 toward the stage 20. Accordingly, the three-dimensional shaping device 100 shapes a three-dimensional shaped object having a desired shape on the stage 20.

Although not illustrated, a plurality of discharge parts 10 may be provided. For example, two discharge parts 10 may be provided. In this case, both of the two discharge parts 10 may discharge the shaping material for forming the three-dimensional shaped object, or one may discharge the shaping material and the other may discharge a support material supporting the three-dimensional shaped object.

The discharge part 10 includes, for example, a material supply part 110, a plasticizing part 120, and a nozzle 160.

A material in a form of pellets or powder is fed into the material supply part 110. The material supply part 110 supplies a material serving as a raw material to the plasticizing part 120. The material supply part 110 is implemented by, for example, a hopper. The material supplied by the material supply part 110 is, for example, an acrylonitrile butadiene styrene (ABS) resin.

As illustrated in FIG. 2, the material supply part 110 and the plasticizing part 120 are coupled by a supply path 112 provided at a lower side of the material supply part 110. The material fed into the material supply part 110 is supplied to the plasticizing part 120 via the supply path 112. In the illustrated example, a "lower side" refers to a −Z-axis direction. An "upper side" refers to a +Z-axis direction.

The plasticizing part 120 includes, for example, a screw case 122, a drive motor 124, a flat screw 130, a barrel 140, and a barrel heater 150. The plasticizing part 120 plasticizes the material in a solid state supplied from the material supply part 110, generates a paste shaping material having fluidity, and supplies the shaping material to the nozzle 160.

"Plasticizing" is a concept including melting, and refers to changing from a solid state to a state of presenting fluidity. Specifically, in a case of a material in which glass transition occurs, the "plasticizing" refers to setting a temperature of the material to be equal to or higher than a glass transition point. In a case of a material in which the glass transition does not occur, the "plasticizing" refers to setting a temperature of the material to be equal to or higher than a melting point thereof.

The screw case 122 is a housing in which the flat screw 130 is accommodated. The barrel 140 is provided at a lower surface of the screw case 122. The flat screw 130 is accommodated in a space defined by the screw case 122 and the barrel 140.

The drive motor 124 is provided at an upper surface of the screw case 122. The drive motor 124 is, for example, a servomotor. A shaft 126 of the drive motor 124 is coupled to an upper surface 131 of the flat screw 130. The drive motor 124 is controlled by the control part 70. Although not illustrated, the shaft 126 of the drive motor 124 and the upper surface 131 of the flat screw 130 may be coupled to each other via a speed reducer.

The flat screw 130 has a substantially cylindrical shape in which a size in a direction of a rotation axis R is smaller than a size in a direction orthogonal to the direction of the rotation axis R. In the illustrated example, the rotation axis R is parallel to the Z axis. The flat screw 130 is rotated about the rotation axis R by a torque generated by the drive motor 124.

Figure 3:
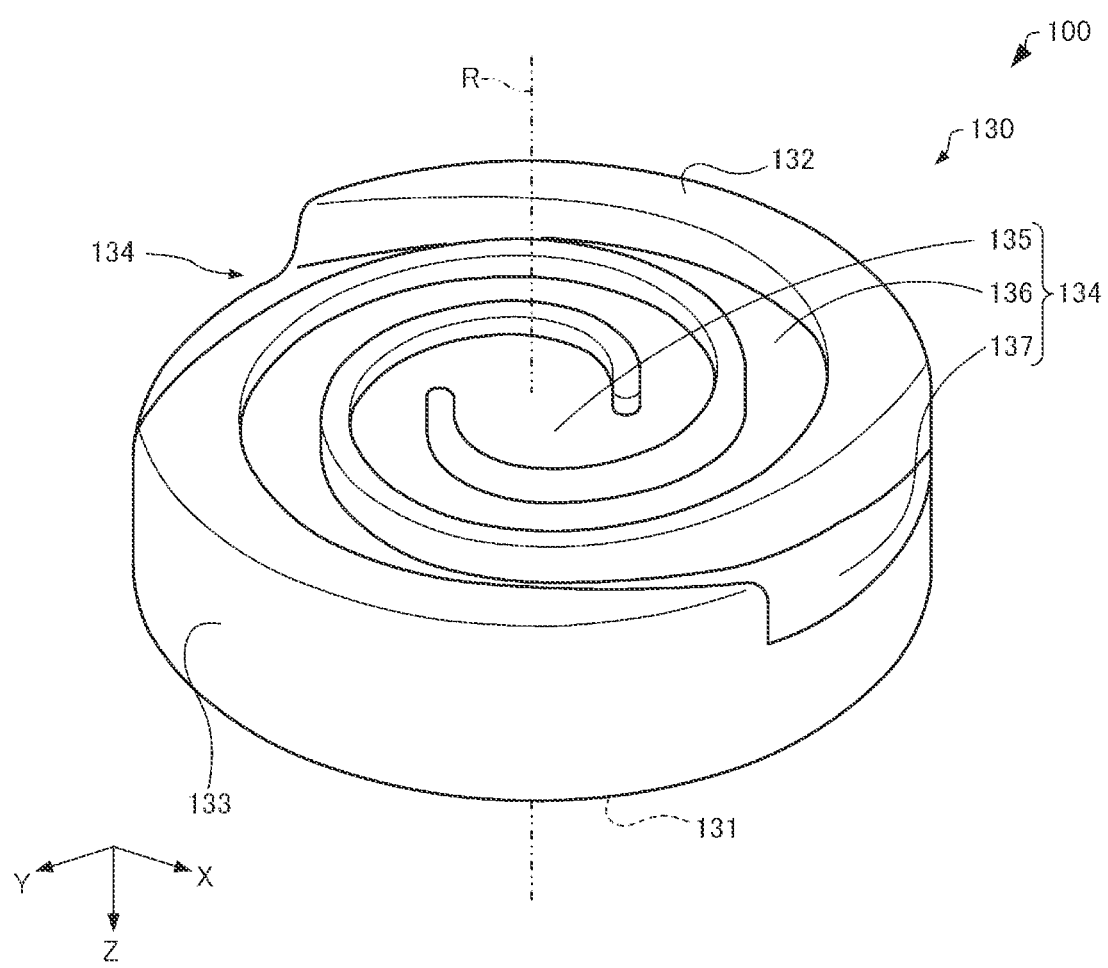
FIG. 3 is a perspective view schematically illustrating a flat screw of the three-dimensional shaping device according to the first embodiment.

The flat screw 130 includes the upper surface 131, a groove forming surface 132 on an opposite side with respect to the upper surface 131, and a side surface 133 connecting the upper surface 131 and the groove forming surface 132. First grooves 134 are formed in the groove forming surface 132. The side surface 133 is, for example, perpendicular to the groove forming surface 132. Here, FIG. 3 is a perspective view schematically illustrating the flat screw 130. For convenience, FIG. 3 illustrates a state in which an up-down positional relationship is reversed from a state illustrated in FIG. 2.

As illustrated in FIG. 3, the first groove 134 is formed in the groove forming surface 132 of the flat screw 130. The first groove 134 includes, for example, a central portion 135, a connection portion 136, and a material introduction portion 137. The central portion 135 faces a communication hole 146 formed in the barrel 140. The central portion 135 communicates with the communication hole 146. The connection portion 136 connects the central portion 135 and the material introduction portion 137. In the illustrated example, the connection portion 136 is provided extending from the central portion 135 toward an outer periphery of the groove forming surface 132, presenting a spiral shape. The material introduction portion 137 is provided at the outer periphery of the groove forming surface 132. That is, the material introduction portion 137 is provided in the side surface 133 of the flat screw 130. The material supplied from the material supply part 110 is introduced from the material introduction portion 137 into the first groove 134, passes through the connection portion 136 and the central portion 135, and is transported to the communication hole 146 formed in the barrel 140. For example, two first grooves 134 are provided.

The number of the first grooves 134 is not particularly limited. Although not illustrated, three or more first grooves 134 may be provided, or only one first groove 134 may be provided. Although not illustrated, the three-dimensional shaping device 100 may include an in-line screw instead of the flat screw 130.

Figure 4:
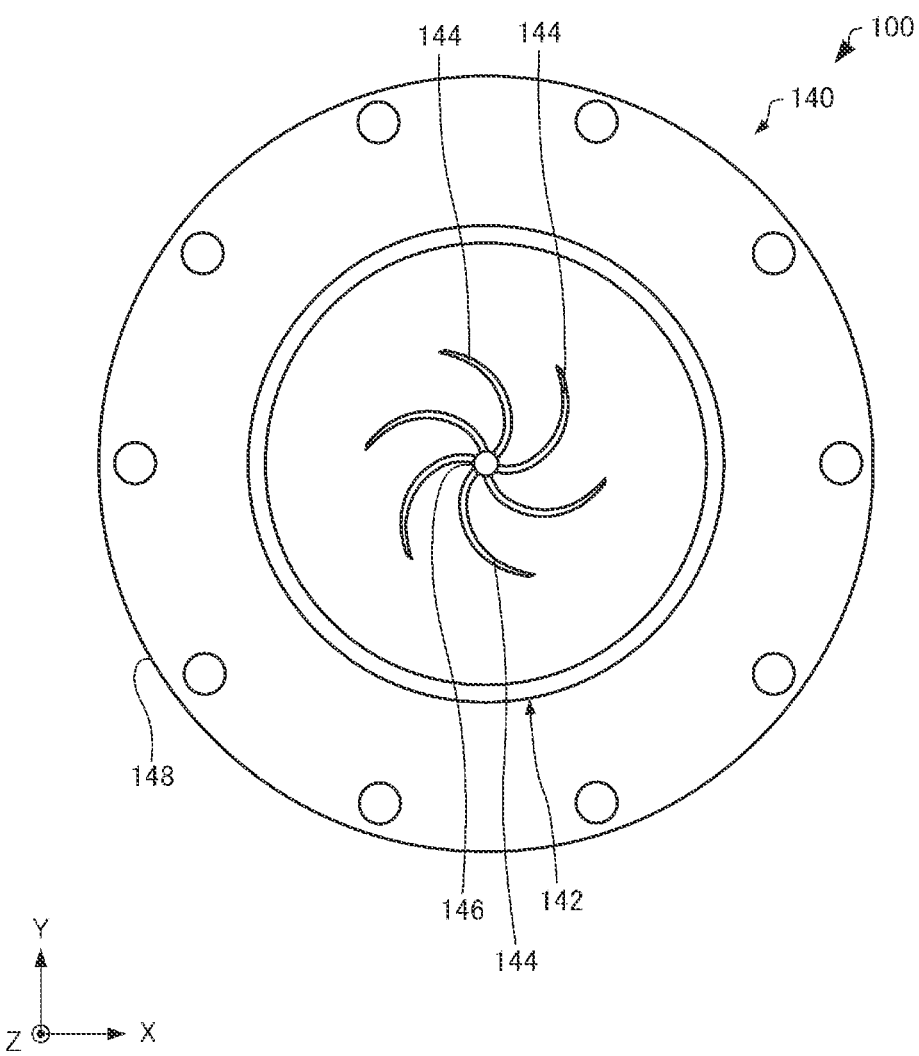
FIG. 4 is a plan view schematically illustrating a barrel of the three-dimensional shaping device according to the first embodiment.

As illustrated in FIG. 2, the barrel 140 is provided at a lower side of the flat screw 130. The barrel 140 has a facing surface 142 facing the groove forming surface 132 of the flat screw 130. The communication hole 146 communicating with the first groove 134 is formed at a center of the facing surface 142. FIG. 4 is a plan view schematically illustrating the barrel 140.

As illustrated in FIG. 4, second grooves 144 and the communication hole 146 are formed in the facing surface 142 of the barrel 140. A plurality of second grooves 144 are formed. In the illustrated example, six second grooves 144 are formed, and the number of the second grooves 144 is not particularly limited. The plurality of second grooves 144 are formed around the communication hole 146 as viewed from the Z-axis direction. The second grooves 144 each have one end coupled to the communication hole 146 and each extend from the communication hole 146 toward an outer periphery 148 of the barrel 140, presenting a spiral shape altogether. The second groove 144 has a function of guiding the plasticized shaping material to the communication hole 146.

A shape of the second groove 144 is not particularly limited, and may be, for example, a straight line shape. In addition, one end of the second groove 144 may not be coupled to the communication hole 146. Further, the second groove 144 may not be formed in the facing surface 142. However, in consideration of efficiently guiding the plasticized shaping material to the communication hole 146, the second groove 144 is preferably formed in the facing surface 142.

As illustrated in FIG. 2, a barrel heater 150 is provided in the barrel 140. The barrel heater 150 heats the material supplied to between the flat screw 130 and the barrel 140. An output of the barrel heater 150 is controlled by the control part 70. The plasticizing part 120 generates a plasticized shaping material by heating the material by the barrel heater 150 while transporting the material toward the communication hole 146 by the flat screw 130, and the barrel 140, and causes the generated shaping material to flow out from the communication hole 146. A shape of the barrel heater 150 may be a ring shape as viewed from the Z-axis direction. The barrel heater 150 may be omitted, and in this case, a heater may be disposed at a position different from the barrel 140.

The nozzle 160 is provided at a lower side of the barrel 140. A nozzle flow path 162 is formed in the nozzle 160. The nozzle flow path 162 communicates with the communication hole 146. The shaping material is supplied to the nozzle flow path 162 from the communication hole 146. The nozzle flow path 162 has a nozzle opening 164. The nozzle 160 discharges the shaping material from the nozzle opening 164 toward the stage 20.

As illustrated in FIGS. 1 and 2, the stage 20 is provided at a lower side of the nozzle 160. In the illustrated example, the stage 20 has a shape of a rectangular parallelepiped. The stage 20 has a shaping surface 22 on which the shaping material is to be deposited. The shaping surface 22 is a region of an upper surface of the stage 20. In the illustrated example, a perpendicular line P of the shaping surface 22 is parallel to the Z axis.

A material of the stage 20 is, for example, a metal such as aluminum. The stage 20 may include a metal plate and an adhesive sheet provided on the metal plate. In this case, the shaping surface 22 is implemented by the adhesive sheet. With the adhesive sheet, the adhesion between the stage 20 and the shaping material discharged from the discharge part 10 can be improved.

Although not illustrated, the stage 20 may include a metal plate in which a groove is formed, and an underlayer provided to fill the groove. In this case, the shaping surface 22 is implemented by the underlayer. A material of the underlayer is, for example, the same as the shaping material. With the underlayer, the adhesion between the stage 20 and the shaping material discharged from the discharge part 10 can be improved.

The moving mechanism 30 supports the stage 20. In the illustrated example, the moving mechanism 30 supports the stage 20 via a first heating part 170 of the heating part 50. The moving mechanism 30 changes a relative position between the nozzle 160 and the stage 20. In the illustrated example, the moving mechanism 30 changes the relative position between the nozzle 160 and the stage 20 in the X-axis direction and the Y-axis direction by moving the stage 20 in the X-axis direction and the Y-axis direction. Further, the moving mechanism 30 changes the relative position between the nozzle 160 and the stage 20 in the Z-axis direction by moving the discharge part 10 in the Z-axis direction.

The moving mechanism 30 includes, for example, a first electric actuator 32, a second electric actuator 34, and a third electric actuator 36. The first electric actuator 32 moves the stage 20 in the X-axis direction. The second electric actuator 34 moves the stage 20 in the Y-axis direction. The third electric actuator 36 moves the discharge part 10 in the Z-axis direction. For example, as long as the relative position between the nozzle 160 and the stage 20 can be changed, the moving mechanism 30 may be configured to move the stage 20 in the Z-axis direction and move the discharge part 10 in the X-axis direction and the Y-axis direction, or may be configured to move the stage 20 or the discharge part 10 in the X-axis direction, the Y-axis direction, and the Z-axis direction.

The support member 40 is coupled to the third electric actuator 36. The support member 40 supports the discharge part 10 and a second heating part 180 of the heating part 50. The moving mechanism 30 moves the discharge part 10 and the second heating part 180 in the Z-axis direction by moving the support member 40 in the Z-axis direction by the third electric actuator 36.

1.1.2. Heating Part 1.1.2.1. First Heating Part

The heating part 50 heats the shaping material deposited on the shaping surface 22 of the stage 20. As illustrated in FIGS. 1 and 2, the heating part 50 includes the first heating part 170. The first heating part 170 is provided at a lower side of the nozzle opening 164. The first heating part 170 is provided at a lower side of the shaping surface 22. The first heating part 170 is supported by the moving mechanism 30. The first heating part 170 is provided between the moving mechanism 30 and the stage 20. The first heating part 170 moves in conjunction with the stage 20. The first heating part 170 heats the stage 20.

As illustrated in FIG. 2, the first heating part 170 includes, for example, a heat insulating member 172, a lower plate 174, a heater 176, and an upper plate 178.

The heat insulating member 172 is provided on the moving mechanism 30. The heat insulating member 172 is provided between the moving mechanism 30 and the lower plate 174. A shape of the heat insulating member 172 is, for example, a plate shape. As the heat insulating member 172, for example, a ROSLIM™ (registered trademark) board is used. The heat insulating member 172 can reduce the heat of the heater 176 transferred to the lower side of the heat insulating member 172.

The lower plate 174 is provided on the heat insulating member 172. The lower plate 174 is provided between the heat insulating member 172 and the heater 176. A material of the lower plate 174 is, for example, aluminum. An upper surface and a lower surface of the lower plate 174 are, for example, polished mirror surfaces. Accordingly, the lower plate 174 can reflect radiant heat from the heater 176 toward the stage 20.

The heater 176 is provided on the lower plate 174. The heater 176 is provided between the lower plate 174 and the upper plate 178. The heater 176 is fixed by being sandwiched between the lower plate 174 and the upper plate 178. The heater 176 is not bonded to the lower plate 174 with a bonding agent. The heater 176 is not bonded to the upper plate 178 with a bonding agent. The heater 176 is fixed by its own weight or a load of the upper plate 178. The heater 176 is, for example, a plate-shaped heater plate. As the heater 176, for example, a rubber heater is used. The heater 176 heats the stage 20 via the upper plate 178.

The upper plate 178 is provided on the heater 176. The upper plate 178 is provided between the heater 176 and the stage 20. The stage 20 is provided on the upper plate 178. A material of the upper plate 178 is, for example, aluminum. For example, an oxide film is provided on an upper surface and a lower surface of the upper plate 178. With the oxide film, radiant heat from the heater 176 can be easily accumulated, and the stage 20 can be efficiently heated. The stage 20 is configured to be detachable. The upper plate 178 can prevent the heater 176 from being exposed when the stage 20 is removed.

Figure 5:
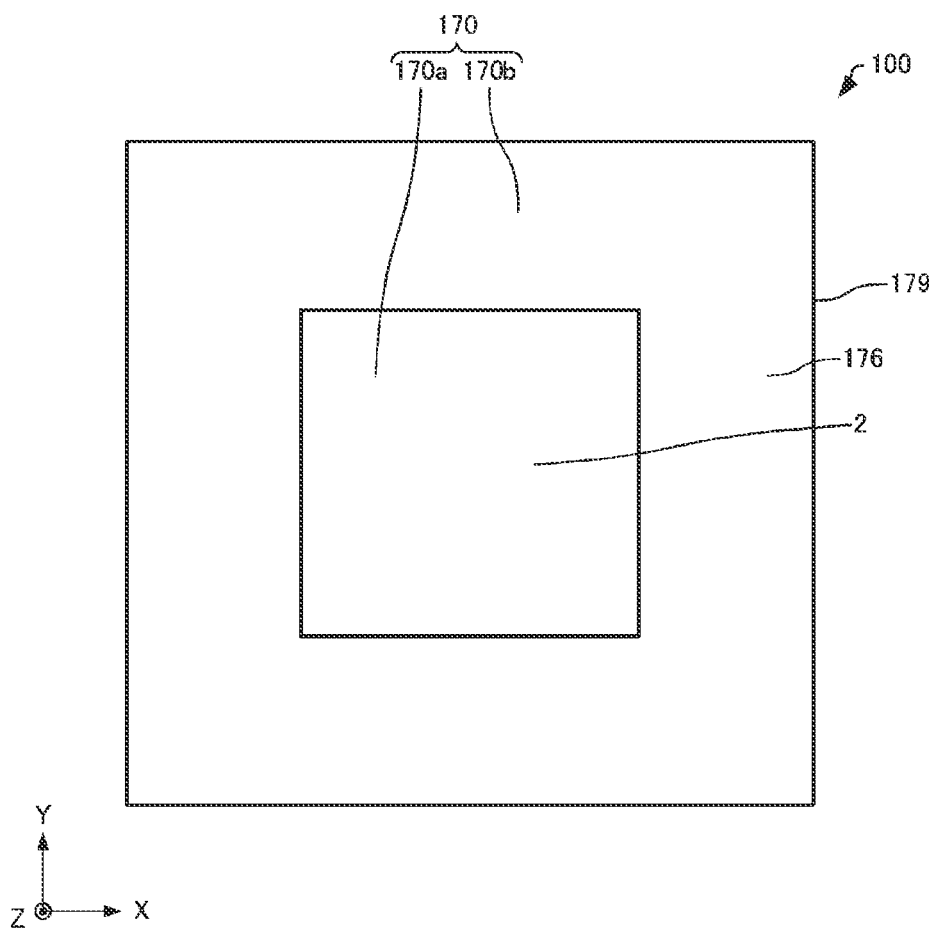
FIG. 5 is a plan view schematically illustrating a first heating part of the three-dimensional shaping device according to the first embodiment.

Here, FIG. 5 is a plan view schematically illustrating the first heating part 170. For convenience, illustration of members other than the heater 176 of the first heating part 170 is omitted in FIG. 5.

As illustrated in FIG. 5, the first heating part 170 includes a first region 170a and a second region 170b that is closer to an outer periphery 179 of the first heating part 170 than is the first region 170a, as viewed from the Z-axis direction. A planar shape of the first heating part 170 is, for example, a quadrangle such as a rectangle or a square.

The first region 170*a* includes a center of the first heating part 170 as viewed from the Z-axis direction. A planar shape of the first region 170*a* is, for example, a quadrangle such as a rectangle or a square. In the illustrated example, the planar shape of the first region 170*a* is a square. A size of the first region 170*a* in the X-axis direction and a size of the first region 170*a* in the Y-axis direction are, for example, about 150 mm.

The first region 170*a* does not include the heater 176. In the example illustrated in FIG. 2, the first region 170*a* includes the heat insulating member 172, the lower plate 174, and the upper plate 178. The heater 176 does not constitute the first region 170*a*. In the first region 170*a*, a gap 2 is formed between the lower plate 174 and the upper plate 178. A planar shape of the gap 2 is the same as the planar shape of the first region 170*a*.

The second region 170*b* is adjacent to the first region 170*a*. As illustrated in FIG. 5, the second region 170*b* surrounds the first region 170*a* as viewed from the Z-axis direction. The second region 170*b* includes the outer periphery 179. A size of the second region 170*b* in the X-axis direction and a size of the second region 170*b* in the Y-axis direction are, for example, about 300 mm. The second region 170*b* includes the heater 176. In the example illustrated in FIG. 2, the second region 170*b* includes the heat insulating member 172, the lower plate 174, the heater 176, and the upper plate 178.

At the time of shaping, a temperature of the second region 170*b* is higher than a temperature of the first region 170*a*. That is, a temperature of a surface of the second region 170*b* on a shaping surface 22 side is higher than a temperature of a surface of the first region 170*a* on the shaping surface 22 side. In the illustrated example, the surface of the first region 170*a* on the shaping surface 22 side and the surface of the second region 170*b* on the shaping surface 22 side are constituted by the upper plate 178.

1.1.2.2. Second Heating Part

As illustrated in FIG. 2, the heating part 50 includes the second heating part 180. The second heating part 180 is provided at an upper side of the shaping surface 22. The second heating part 180 is supported by the support member 40. The second heating part 180 moves in conjunction with the nozzle 160.

The second heating part 180 is provided at an upper side of a position of the nozzle opening 164 at the time of shaping. The second heating part 180 is provided with a through hole 182. The through hole 182 penetrates the second heating part 180 in the Z-axis direction. At the time of shaping, the nozzle 160 is positioned in the through hole 182.

The second heating part 180 covers at least a part of the shaping surface 22 when the nozzle opening 164 is positioned at the center of the stage 20 as viewed from the Z-axis direction. When the nozzle opening 164 is positioned at the center of the stage 20 as viewed from the Z-axis direction, the second heating part 180 may cover only a part of the shaping surface 22 or may cover the entire shaping surface 22. The second heating part 180 heats the shaping surface 22.

The second heating part 180 includes, for example, a heater 184 and a heat insulating member 186.

The heater 184 faces the shaping surface 22. The heater 184 is provided between the shaping surface 22 and the heat insulating member 186. The heater 184 is, for example, a plate-shaped heater plate. As the heater 184, for example, a rubber heater is used. The heater 184 heats the shaping surface 22.

The heat insulating member 186 is provided on the heater 184. The heat insulating member 186 is coupled to the support member 40. A shape of the heat insulating member 186 is, for example, a plate shape. The heat insulating member 186 can reduce the heat of the heater 184 transferred to the upper side of the heat insulating member 186.

Figure 6:
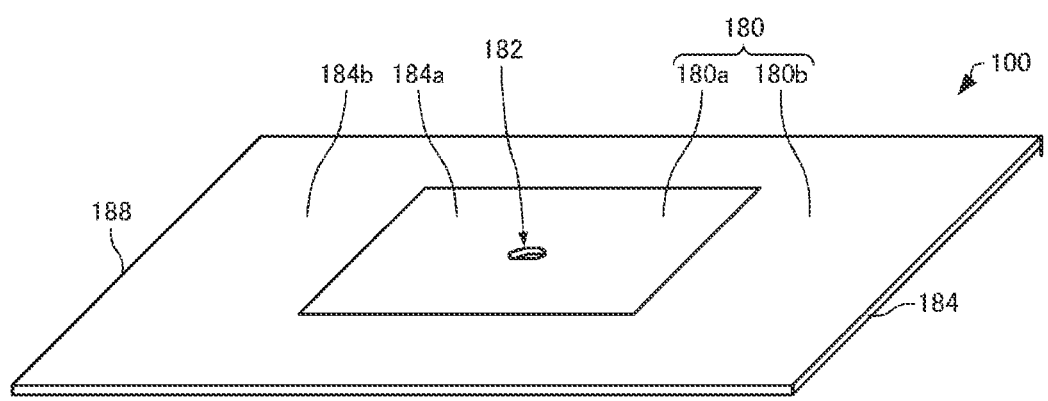
FIG. 6 is a perspective view schematically illustrating a second heating part of the three-dimensional shaping device according to the first embodiment.

Here, FIG. 6 is a perspective view schematically illustrating the second heating part 180. As illustrated in FIG. 6, the second heating part 180 includes a first region 180*a* and a second region 180*b* that is closer to an outer periphery 188 of the second heating part 180 than is the first region 180*a*, as viewed from the Z-axis direction. A planar shape of the first heating part 180 is, for example, a quadrangle such as a rectangle or a square.

As illustrated in FIGS. 2 and 6, the heater 184 includes, for example, a first portion 184*a* and a second portion 184*b*. The first portion 184*a* is the heater 184 in the first region 180*a*. The second portion 184*b* is the heater 184 in the second region 180*b*. In the illustrated example, the first portion 184*a* and the second portion 184*b* are coupled to each other.

In the illustrated example, the first region 180*a* includes the first portion 184*a* and the heat insulating member 186. The second region 180*b* includes the second portion 184*b* and the heat insulating member 186.

A planar shape of the first region 180*a* is, for example, a quadrangle such as a rectangle or a square. In the example illustrated in FIG. 6, the planar shape of the first region 180*a* is a square. The planar shape of the first region 180*a* is the same as a planar shape of the first portion 184*a*. A size of the first region 180*a* in the X-axis direction and a size of the first region 180*a* in the Y-axis direction are, for example, about 300 mm. The through hole 182 is formed in the first region 180*a*.

The second region 180*b* is adjacent to the first region 180*a*. As illustrated in FIG. 6, the second region 180*b* surrounds the first region 180*a* as viewed from the Z-axis direction. A planar shape of the second region 180*b* is the same as a planar shape of the second portion 184*b*. The second region 180*b* includes the outer periphery 188. A size of the second region 180*b* in the X-axis direction is, for example, about 600 mm. A size of the second region 180*b* in the Y-axis direction is, for example, about 700 mm.

At the time of shaping, a temperature of the second region 180*b* is higher than a temperature of the first region 180*a*. That is, a temperature of a surface of the second region 180*b* on the shaping surface 22 side is higher than a temperature of a surface of the first region 180*a* on the shaping surface 22 side. In the example illustrated in FIG. 2, the surface of the first region 180*a* on the shaping surface 22 side and the surface of the second region 180*b* on the shaping surface 22 side are constituted by the upper plate 184.

1.1.3. Temperature Sensor

As illustrated in FIG. 2, the first temperature sensor 60 is provided, for example, in the −X-axis direction of the heater 176. The first temperature sensor 60 is supported by a support part (not illustrated). The first temperature sensor 60 detects a temperature of the heater 176.

The second temperature sensor 62 is supported by the heat insulating member 186. For example, the second temperature sensor 62 overlaps the first portion 184*a* of the heater 184 of the second heating part 180 as viewed from the Z-axis direction. The second temperature sensor 62 detects a temperature of the first portion 184*a* of the heater 184.

The third temperature sensor 64 is supported by the heat insulating member 186. For example, the third temperature sensor 64 overlaps the second portion 184b of the heater 184 of the second heating part 180 as viewed from the Z-axis direction. The third temperature sensor 64 detects a temperature of the second portion 184b of the heater 184. The temperature sensors 60, 62, and 64 are, for example, non-contact thermometers.

1.1.4. Control Part

The control part 70 is implemented by, for example, a computer including a processor, a main storage device, and an input and output interface for exchanging a signal with an outside. The control part 70 implements various functions by, for example, the processor executing a program loaded into the main storage device. Specifically, the control part 70 controls the discharge part 10, the moving mechanism 30, and the heating part 50. The control part 70 may be implemented by a combination of a plurality of circuits instead of the computer.

Figure 7:
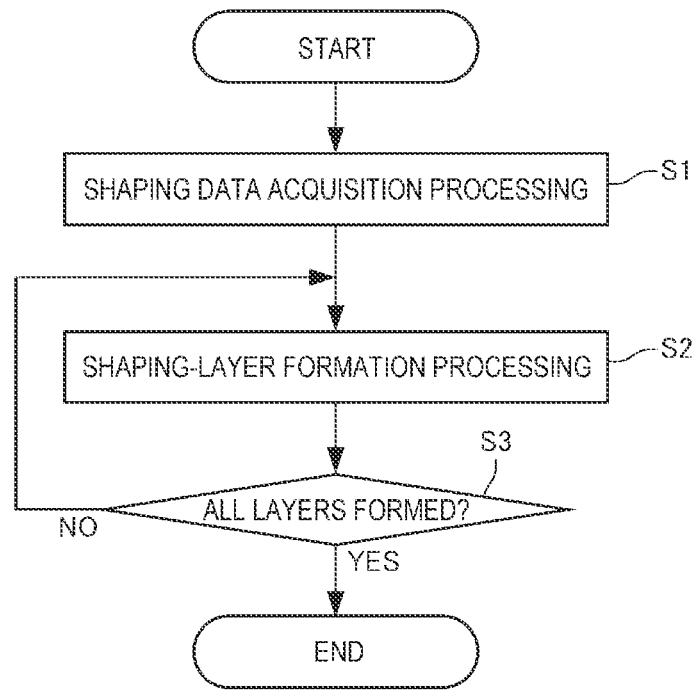
FIG. 7 is a flowchart illustrating processing performed by a control part of the three-dimensional shaping device according to the first embodiment.

Here, FIG. 7 is a flowchart illustrating processing of the control part 70.

First, as illustrated in FIG. 7, as step S1, the control part 70 performs shaping data acquisition processing of acquiring shaping data for shaping a three-dimensional shaped object.

The shaping data includes information on a type of material stored in the material supply part 110, a movement path of the nozzle 160 with respect to the stage 20, an amount of shaping material to be discharged from the nozzle 160, and the like.

The shaping data is created by, for example, causing slicer software installed in a computer coupled to the three-dimensional shaping device 100 to read shape data. The shape data is data representing a target shape of the three-dimensional shaped object created using three-dimensional computer aided design (CAD) software, three-dimensional computer graphics (CG) software, and the like. As the shape data, for example, data in a standard triangulated language (STL) format or an additive manufacturing file format (AMF) is used. The slicer software divides the target shape of the three-dimensional shaped object into layers having a predetermined thickness, and creates shaping data for each layer. The shaping data is represented by a G code, an M code, or the like. The control part 70 acquires the shaping data from the computer coupled to the three-dimensional shaping device 100 or from a recording medium such as a universal serial bus (USB) memory.

Next, as step S2, the control part 70 performs shaping-layer formation processing of forming a shaping layer by discharging the shaping material onto the shaping surface 22 of the stage 20.

Specifically, the control part 70 plasticizes the material supplied to between the flat screw 130 and the barrel 140 to generate the shaping material, and discharges the shaping material from the nozzle 160. For example, the control part 70 continuously generates the shaping material until the shaping-layer formation processing is completed.

Further, the control part 70 controls the first heating part 170 to make the temperature of the second region 170b higher than the temperature of the first region 170a. For example, the control part 70 controls an output of the heater 176 based on a detection value of the first temperature sensor 60.

The control part 70 controls the second heating part 180 to make the temperature of the second region 180b higher than the temperature of the first region 180a. The control part 70 can individually control an output of the first portion 184a and an output of the second portion 184b of the heater 184. For example, the control part 70 performs control such that the output of the second portion 184b of the heater 184 is larger than the output of the first portion 184a of the heater 184. For example, the control part 70 performs control such that a power density of the second portion 184b of the heater 184 is higher than a power density of the first portion 184a of the heater 184. For example, the control part 70 controls the output of the first portion 184a based on a detection value of the second temperature sensor 62. For example, the control part 70 controls the output of the second portion 184b based on a detection value of the third temperature sensor 64.

Figure 8:
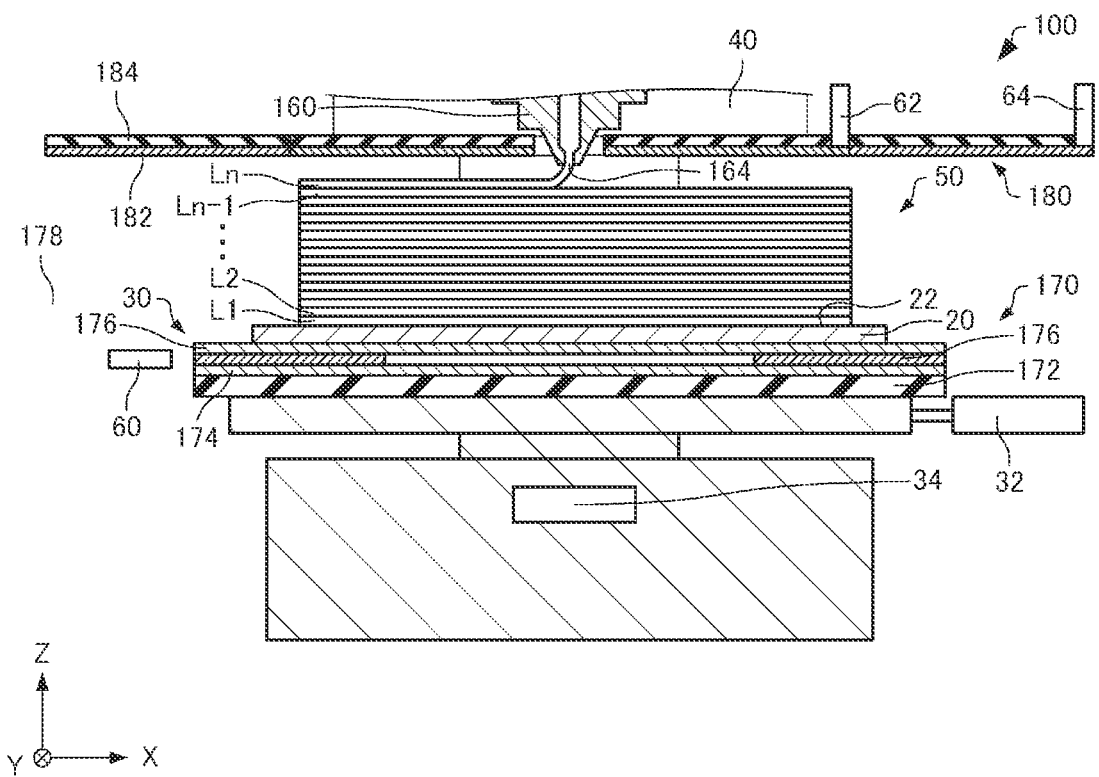
FIG. 8 is a cross-sectional view illustrating shaping-layer formation processing of the three-dimensional shaping device according to the first embodiment.

FIG. 8 is a cross-sectional view illustrating the shaping-layer formation processing.

As illustrated in FIG. 8, the control part 70 controls the moving mechanism 30 to change the relative position between the nozzle 160 and the stage 20 based on the acquired shaping data, and controls the discharge part 10 to discharge the shaping material from the nozzle 160 toward the stage 20.

Specifically, before the shaping-layer formation processing is started, that is, before formation of a shaping layer L1 that is a first shaping layer is started, the nozzle 160 is disposed at an initial position in the −X axis direction with respect to an end portion of the stage 20 in the −X axis direction. When the shaping-layer formation processing is started, as illustrated in FIG. 8, the control part 70 controls the moving mechanism 30 to move the nozzle 160 in the +X-axis direction relative to the stage 20, for example. When the nozzle 160 passes over the stage 20, the shaping material is discharged from the nozzle 160. Accordingly, the shaping layer L1 is formed. In FIG. 8, n is any natural number, and layers up to the n-th shaping layer Ln are illustrated.

Next, as illustrated in FIG. 7, as step S3, the control part 70 performs determination processing of determining, based on the shaping data, whether the formation of all the shaping layers is completed.

When it is determined that the formation of all the shaping layers is not completed ("NO" in step S3), the control part 70 returns the processing to step S2. The control part 70 repeats step S2 and step S3 until it is determined in step S3 that the formation of all the shaping layers is completed.

On the other hand, when it is determined that the formation of all the shaping layers is completed ("YES" in step S3), the control part 70 ends the processing.

1.1.5. Operation and Effect

In the three-dimensional shaping device 100, the heating part 50 includes the first region 180a and the second region 180b closer to the outer periphery 188 of the heating part 50 than is the first region 180a as viewed from the Z-axis direction, and the control part 70 controls the heating part 50 to make the temperature of the second region 180b higher than the temperature of the first region 180a.

Therefore, in the three-dimensional shaping device 100, for example, as compared with a case where the temperature of the second region is the same as the temperature of the first region, the temperature of the shaping material deposited in the second region 180b becoming lower than the temperature of the shaping material deposited in the first region 180a due to the shaping material deposited in the second region 180b being cooled by the outside air can be prevented. Accordingly, it is possible to lower the possibility of occurrence of warpage or deformation in the shaping material deposited in the second region 180b.

In the three-dimensional shaping device 100, the heating part 50 includes the first heating part 170 provided at the lower side of the nozzle opening 164, the first heating part 170 heats the stage 20, the second region 170b of the first heating part 170 includes the heater 176, and the first region 170a of the first heating part 170 does not include the heater 176. Therefore, in the three-dimensional shaping device 100, the temperature of the second region 170b of the first heating part 170 can be made higher than the temperature of the first region 170a of the first heating part 170.

In the three-dimensional shaping device 100, the heating part 50 includes the second heating part 180 provided at the upper side of the position of the nozzle opening 164 at the time of shaping. The second heating part 180 moves in conjunction with the nozzle opening 164, and covers at least a part of the shaping surface 22 when the nozzle opening 164 is positioned at the center of the stage 20 as viewed from the Z-axis direction. Therefore, in the three-dimensional shaping device 100, at least a part of the shaping surface 22 can be heated by the second heating part 180.

In the three-dimensional shaping device 100, the first region 180a and the second region 180b of the second heating part 180 include the heater 184, and the control part 70 performs control so that the output of the heater 184 in the second region 180b is larger than the output of the heater 184 in the first region 180a. Therefore, in the three-dimensional shaping device 100, the temperature of the second region 180b of the second heating part 180 can be made higher than the temperature of the first region 180a of the second heating part 180.

The three-dimensional shaping device 100 includes the first temperature sensor 60 that detects the temperature of the heater 176, and the control part 70 controls the output of the heater 176 based on the detection value of the first temperature sensor 60. Therefore, in the three-dimensional shaping device 100, the output of the heater 176 can be controlled based on the temperature of the heater 176.

In the three-dimensional shaping device 100, the first heating part 170 includes the lower plate 174 and the upper plate 178, and the heater 176 as a heater plate is fixed by being sandwiched between the lower plate 174 and the upper plate 178. Therefore, in the three-dimensional shaping device 100, since the heater 176 is not fixed by a bonding agent, the warpage of the heater 176 due to the bimetal can be reduced.

2. Second Embodiment 2.1. Three-Dimensional Shaping Device

Figure 9:
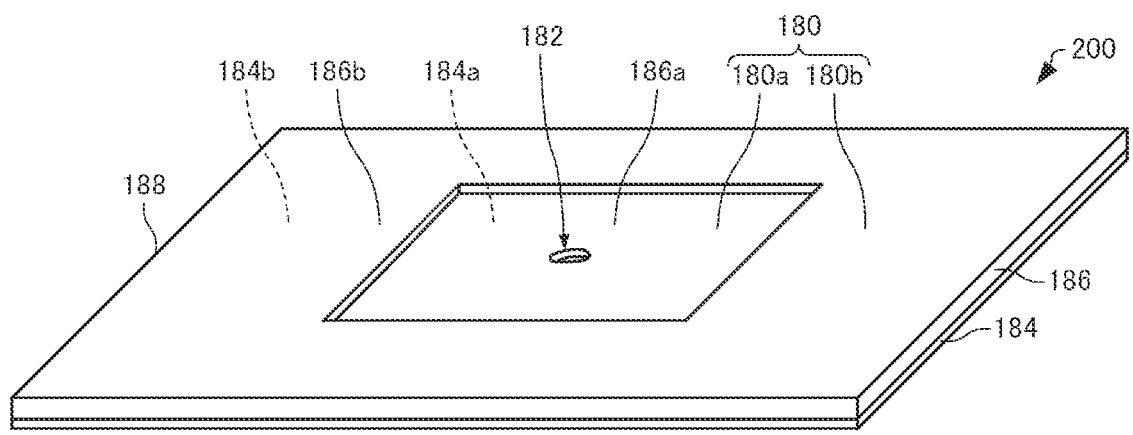
FIG. 9 is a perspective view schematically illustrating a second heating part of a three-dimensional shaping device according to a second embodiment.

Next, a three-dimensional shaping device according to a second embodiment will be described with reference to the drawings. FIG. 9 is a perspective view schematically illustrating a three-dimensional shaping device 200 according to the second embodiment. Hereinafter, in the three-dimensional shaping device 200 according to the second embodiment, members having the same functions as those of the constituent members of the three-dimensional shaping device 100 described above are denoted by the same reference signs, and a detailed description thereof will be omitted.

As illustrated in FIG. 9, the three-dimensional shaping device 200 is different from the three-dimensional shaping device 100 described above in that a thickness of a fourth portion 186b of the heat insulating member 186 is larger than a thickness of a third portion 186a. In the illustrated example, the "thickness" refers to a size in the Z-axis direction.

The heat insulating member 186 includes the third portion 186a and the fourth portion 186b. A planar shape of the third portion 186a is, for example, the same as the planar shape of the first portion 184a. The planar shape of the fourth portion 186b is, for example, the same as the planar shape of the second portion 184b. In the illustrated example, the first region 180a includes the first portion 184a and the third portion 186a. The second region 180b includes the second portion 184b and the fourth portion 186b. The third portion 186a is the heat insulating member 186 in the first region 180a. The fourth portion 186b is the heat insulating member 186 in the second region 180b. In the illustrated example, the third portion 186a and the fourth portion 186b are coupled to each other.

In the three-dimensional shaping device 200, a thickness of the heat insulating member 186 in the second region 180b is larger than a thickness of the heat insulating member 186 in the first region 180a. Therefore, in the three-dimensional shaping device 200, for example, as compared with a case where the thickness of the heat insulating member in the second region is the same as the thickness of the heat insulating member in the first region, a temperature of the second region 180b of the second heating part 180 can be made higher than a temperature of the first region 180a of the second heating part 180. For example, even if the output of the heater 184 in the second region 180b is not made larger than the output of the heater 184 in the first region 180a by the control part 70, the temperature of the second region 180b can be made higher than the temperature of the first region 180a.

Although not illustrated, a thickness of the heat insulating member 172 in the second region 170b of the first heating part 170 may be larger than a thickness of the heat insulating member 172 in the first region 170a of the first heating part 170.

2.2. Modification

Figure 10:
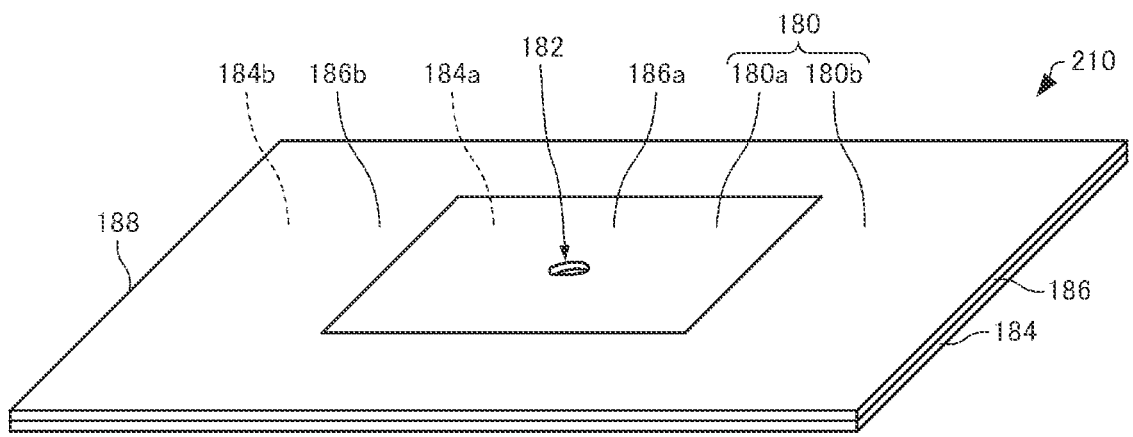
FIG. 10 is a perspective view schematically illustrating a second heating part of a three-dimensional shaping device according to a modification of the second embodiment.

Next, a three-dimensional shaping device according to a modification of the second embodiment will be described with reference to the drawings. FIG. 10 is a cross-sectional view schematically illustrating a three-dimensional shaping device 210 according to the modification of the second embodiment. Hereinafter, in the three-dimensional shaping device 210 according to the modification of the second embodiment, members having the same functions as those of the constituent members of the three-dimensional shaping devices 100 and 200 described above are denoted by the same reference signs, and a detailed description thereof will be omitted.

As illustrated in FIG. 10, the three-dimensional shaping device 210 is different from the three-dimensional shaping device 200 described above in that thermal conductivity of the fourth portion 186b is lower than thermal conductivity of the third portion 186a.

As the third portion 186a, for example, an INSULTEX™ (registered trademark) cloth is used. As the fourth portion 186b, for example, a ROSLIM™ board is used. A thickness of the third portion 186a and a thickness of the fourth portion 186b are, for example, the same. Although not illustrated, the thickness of the fourth portion 186b may be larger or smaller than the thickness of the third portion 186a.

In the three-dimensional shaping device 210, the heating part 50 includes the heat insulating member 186 and the heater 184 as a heater plate provided between the heat insulating member 186 and the shaping surface 22, and thermal conductivity of the heat insulating member 186 in the second region 180b is lower than thermal conductivity of the heat insulating member 186 in the first region 180a.

Therefore, in the three-dimensional shaping device 210, a temperature of the second region 180b of the second heating part 180 can be made higher than a temperature of the first region 180a of the second heating part 180, as compared with a case where the thermal conductivity of the heat insulating member in the second region is the same as the thermal conductivity of the heat insulating member in the first region. For example, even if an output of the heater 184 in the second region 180b is not made larger than an output of the heater 184 in the first region 180a by the control part 70, the temperature of the second region 180b can be made higher than the temperature of the first region 180a.

Thermal conductivity of the heat insulating member 172 in the second region 170b of the first heating part 170 may be lower than thermal conductivity of the heat insulating member 172 in the first region 170a of the first heating part 170.

3. Third Embodiment 3.1. Three-Dimensional Shaping Device

Figure 11:
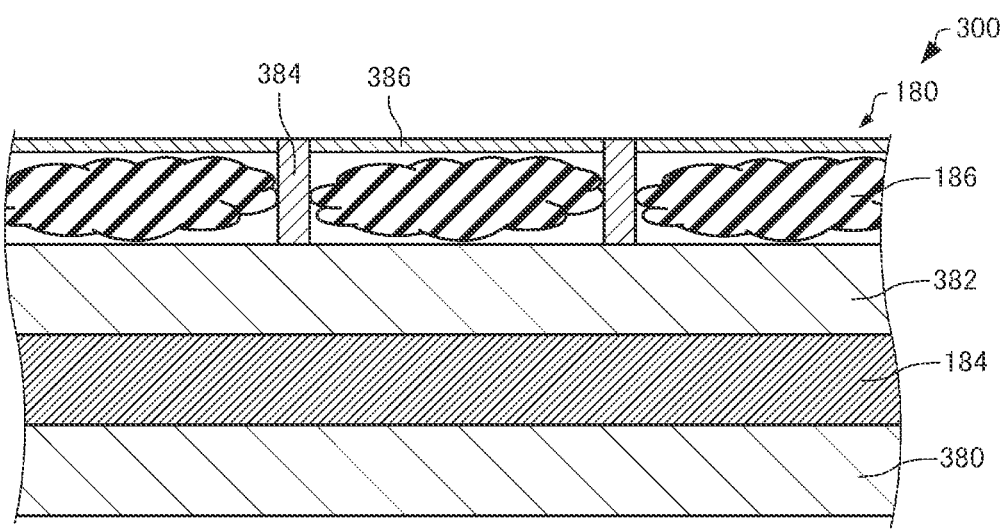
FIG. 11 is a cross-sectional view schematically illustrating a second heating part of a three-dimensional shaping device according to a third embodiment.

Next, a three-dimensional shaping device according to a third embodiment will be described with reference to the drawings. FIG. 11 is a cross-sectional view schematically illustrating a three-dimensional shaping device 300 according to the third embodiment. Hereinafter, in the three-dimensional shaping device 300 according to the third embodiment, members having the same functions as those of the constituent members of the three-dimensional shaping device 100 described above are denoted by the same reference signs, and a detailed description thereof will be omitted.

In the three-dimensional shaping device 300, as illustrated in FIG. 11, a configuration of the second heating part 180 is different from that of the three-dimensional shaping device 100 described above.

As illustrated in FIG. 11, the second heating part 180 of the three-dimensional shaping device 300 includes, for example, a lower plate 380, the heater 184, an upper plate 382, the heat insulating member 186, a reinforcing member 384, and a radiant heat suppressing member 386.

The lower plate 380 faces the shaping surface 22 of the stage 20. A material of the lower plate 380 is, for example, aluminum. For example, an oxide film is provided on an upper surface and a lower surface of the lower plate 380. With the oxide film, radiant heat from the heater 184 can be easily accumulated, and the shaping material deposited on the shaping surface 22 can be efficiently heated.

The heater 184 is provided on the lower plate 380. The heater 184 is provided between the lower plate 380 and the upper plate 382. The heater 184 is fixed by being sandwiched between the lower plate 380 and the upper plate 382. The heater 184 is not bonded to the lower plate 380 with a bonding agent. The heater 184 is not bonded to the upper plate 382 with a bonding agent. The heater 184 is fixed by its own weight or a load of the upper plate 382.

The upper plate 382 is provided on the heater 184. The upper plate 382 is provided between the heater 184 and the heat insulating member 186. A material of the upper plate 382 is, for example, aluminum. An upper surface and a lower surface of the upper plate 382 are, for example, polished mirror surfaces. Accordingly, the radiant heat from the heater 184 can be reflected to the shaping surface 22 side.

The heat insulating member 186 is provided on the upper plate 382. The heat insulating member 186 is provided between the upper plate 382 and the radiant heat suppressing member 386. For example, the heat insulating member 186 is cotton-shaped. By using the cotton-shaped heat insulating member 186, weight reduction can be achieved as compared with a case of using, for example, a plate-shaped heat insulating member. As the heat insulating member 186, for example, alkaline earth silicate (AES) wool is used.

The reinforcing member 384 is provided on the upper plate 382. The reinforcing member 384 is provided between the upper plate 382 and the radiant heat suppressing member 386. The reinforcing member 384 is coupled to the upper plate 382 and the radiant heat suppressing member 386. A material of the reinforcing member 384 is, for example, steel use stainless (SUS). The reinforcing member 384 reinforces the second heating part 180.

The radiant heat suppressing member 386 is provided on the heat insulating member 186 and the reinforcing member 384. As the radiant heat suppressing member 386, for example, an aluminum foil is used. The heater 184 is provided between the shaping surface 22 and the radiant heat suppressing member 386. The radiant heat suppressing member 386 suppresses the radiant heat from the heater 184 from being transferred to an opposite side with respect to the shaping surface 22. A lower surface of the radiant heat suppressing member 386 is, for example, a polished mirror surface. Accordingly, the radiant heat suppressing member 386 can reflect the radiant heat from the heater 184 to the shaping surface 22 side. An oxide film may be provided on an upper surface of the radiant heat suppressing member 386.

In the three-dimensional shaping device 300, the heating part 50 includes the lower plate 380 and the upper plate 382, and the heater 184 as a heater plate is fixed by being sandwiched between the lower plate 380 and the upper plate 382. Therefore, in the three-dimensional shaping device 300, since the heater 184 is not fixed with a bonding agent, the warpage of the heater 184 due to bimetal can be reduced.

In the three-dimensional shaping device 300, the heating part 50 includes the radiant heat suppressing member 386 that suppresses the radiant heat from the heater 184 serving as a heater plate from being transferred to the opposite side with respect to the shaping surface 22, and the heater 184 is provided between the shaping surface 22 and the radiant heat suppressing member 386. Therefore, with the three-dimensional shaping device 300, it is possible to efficiently heat the shaping material deposited on the shaping surface 22 as compared with a case where the radiation heat suppressing member is not provided.

Although not illustrated, the first heating part 170 may include a radiant heat suppressing member that suppresses radiant heat from the heater 176 from being transferred to the opposite side with respect to the shaping surface 22.

3.2. Modification

Figure 12:
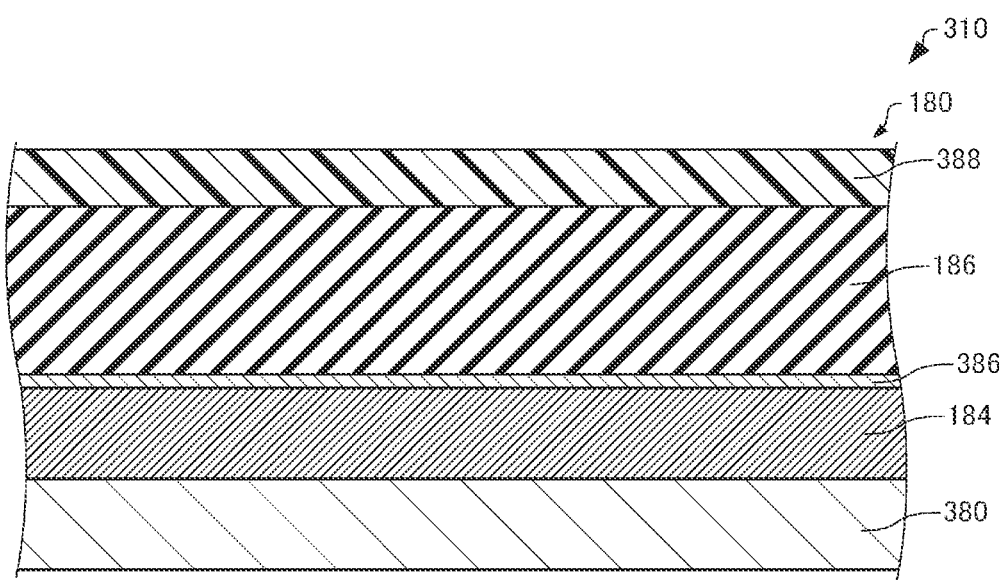
FIG. 12 is a cross-sectional view schematically illustrating a second heating part of a three-dimensional shaping device according to a modification of the third embodiment.

Next, a three-dimensional shaping device according to a modification of the third embodiment will be described with reference to the drawings. FIG. 12 is a cross-sectional view schematically illustrating a three-dimensional shaping device 310 according to the modification of the third embodiment. Hereinafter, in the three-dimensional shaping device 310 according to the modification of the third embodiment, members having the same functions as those of the constituent members of the three-dimensional shaping devices 100 and 300 described above are denoted by the same reference signs, and a detailed description thereof will be omitted.

In the three-dimensional shaping device 310, as illustrated in FIG. 12, a configuration of the second heating part 180 is different from that of the three-dimensional shaping device 300 described above.

As illustrated in FIG. 12, the second heating part 180 of the three-dimensional shaping device 310 includes, for example, the lower plate 380, the heater 184, the radiant heat suppressing member 386, the heat insulating member 186, and a cover 388.

The heater 184 is provided between the lower plate 380 and the radiant heat suppressing member 386. The radiant heat suppressing member 386 is provided on the heater 184. The radiant heat suppressing member 386 is provided between the heater 184 and the heat insulating member 186. The heat insulating member 186 is provided on the radiant heat suppressing member 386. The heat insulating member 186 is provided between the radiant heat suppressing member 386 and the cover 388. A shape of the heat insulating member 186 is a plate shape. As the heat insulating member 186, for example, a ROSLIM™ board is used. The cover 388 is provided on the heat insulating member 186. A material of the cover 388 is, for example, plastic.

4. Fourth Embodiment

Next, a three-dimensional shaping device according to a fourth embodiment will be described.

Hereinafter, with respect to the three-dimensional shaping device according to the fourth embodiment, points different from the example of the three-dimensional shaping device 100 according to the first embodiment described above will be described, and a description of the same points will be omitted.

In the three-dimensional shaping device 100 described above, the material supplied from the material supply part 110 is the ABS resin.

Meanwhile, in the three-dimensional shaping device according to the fourth embodiment, the material supplied from the material supply part 110 is a material other than the ABS resin or a material obtained by adding another component to the ABS resin.

Examples of the material supplied from the material supply part 110 include materials having various materials such as a thermoplastic material, a metal material, and a ceramic material as a main material. Here, the "main material" means a material serving as a main component forming a shape of a shaped object, and means a material having a content of 50% by mass or more in the shaped object. The materials described above include those acquired by melting these main materials alone, and those acquired by melting a part of components contained together with the main materials into a paste form.

As the thermoplastic material, for example, a thermoplastic resin can be used. Examples of the thermoplastic resin include general-purpose engineering plastics and super engineering plastics.

Examples of the general-purpose engineering plastic include polypropylene (PP), polyethylene (PE), polyacetal (POM), polyvinyl chloride (PVC), polyamide (PA), polylactic acid (PLA), polyphenylene sulfide (PPS), polycarbonate (PC), modified polyphenylene ether, polybutylene terephthalate, and polyethylene terephthalate.

Examples of the super engineering plastic include polysulfone (PSU), polyethersulfone (PES), polyphenylene sulfide (PPS), polyarylate (PAR), polyimide (PI), polyamideimide (PAI), polyetherimide (PEI), and polyether ether ketone (PEEK).

Additives such as a pigment, a metal, a ceramic, a wax, a flame retardant, an antioxidant, and a heat stabilizer may be mixed into the thermoplastic material. In the plasticizing part 120, the thermoplastic material is plasticized and converted into a molten state by the rotation of the flat screw 130 and the heating of the barrel heater 150. The shaping material generated in this way is deposited from the nozzle 160 and then cured due to a decrease in temperature. The thermoplastic material may be discharged from the nozzle 160 in a state in which the material is heated to a temperature equal to or higher than a glass transition point thereof and is melted completely.

In the plasticizing part 120, for example, the metal material may be used as the main material instead of the thermoplastic material described above. In this case, a component to be melted at the time of generating the shaping material may be mixed into a powder material obtained by converting the metal material into a powder, and then the mixture is fed into the plasticizing part 120.

Examples of the metal material include a single metal such as magnesium (Mg), iron (Fe), cobalt (Co), chromium (Cr), aluminum (Al), titanium (Ti), copper (Cu), and nickel (Ni), or an alloy containing one or more of these metals, or maraging steel, stainless steel, a cobalt-chromium-molybdenum alloy, a titanium alloy, a nickel alloy, an aluminum alloy, a cobalt alloy, and a cobalt-chromium alloy.

In the plasticizing part 120, the ceramic material may be used as the main material instead of the metal material described above. Examples of the ceramic material include an oxide ceramic such as silicon dioxide, titanium dioxide, aluminum oxide, and zirconium oxide, and a non-oxide ceramic such as aluminum nitride.

A powder material of the metal material or the ceramic material supplied from the material supply part 110 may be a mixed material in which a plurality of types of powder of the single metals or powder of the alloys are mixed, or a mixed material in which a plurality of types of powder of the ceramic materials are mixed. In addition, the powder material of the metal material or the ceramic material may be coated with, for example, the above-described thermoplastic resin or another thermoplastic resin. In this case, the thermoplastic resin may be melted to exhibit fluidity in the plasticizing part 120.

For example, a solvent may be added to the powder material of the metal material or the ceramic material supplied from the material supply part 110. Examples of the solvent include: water; (poly)alkylene glycol monoalkyl ethers such as ethylene glycol monomethyl ether, ethylene glycol monoethyl ether, propylene glycol monomethyl ether, and propylene glycol monoethyl ether; acetate esters such as ethyl acetate, n-propyl acetate, isopropyl acetate, n-butyl acetate, and iso-butyl acetate; aromatic hydrocarbons such as benzene, toluene, and xylene; ketones such as methyl ethyl ketone, acetone, methyl isobutyl ketone, ethyl-n-butyl ketone, diisopropyl ketone, and acetylacetone; alcohols such as ethanol, propanol, and butanol; tetraalkylammonium acetates; sulfoxide-based solvents such as dimethyl sulfoxide and diethyl sulfoxide; pyridine-based solvents such as pyridine, γ-picoline, and 2,6-lutidine; tetraalkylammonium acetates (such as tetrabutylammonium acetate); and ionic liquids such as butyl carbitol acetate.

In addition, for example, a binder may be added to the powder material of the metal material or the ceramic material supplied from the material supply part 110. Examples of the binder include an acrylic resin, an epoxy resin, a silicone resin, a cellulose-based resin, other synthetic resins, PLA, PA, PPS, PEEK, and other thermoplastic resins.

The embodiments and the modifications described above are merely examples, and the present disclosure is not limited thereto. For example, the embodiments and the modifications can be appropriately combined.

The present disclosure includes a configuration substantially the same as the configurations described in the embodiments, for example, a configuration having the same functions, methods, and results, or a configuration having the same objects and effects. In addition, the present disclosure includes a configuration in which a non-essential portion of the configurations described in the embodiments is replaced. In addition, the present disclosure includes a configuration having the same operation and effect as the configurations described in the embodiments, or a configuration capable of achieving the same object. Further, the present disclosure includes a configuration obtained by adding a known technique to the configurations described in the embodiments.

The following contents are derived from the above-described embodiments and modifications.

One aspect of a three-dimensional shaping device includes: a discharge part that includes a nozzle configured to discharge a shaping material from a nozzle opening thereof; a stage that includes a shaping surface on which the shaping material is to be deposited; a heating part configured to heat the shaping material deposited on the stage; and a control part configured to control the heating part, the heating part includes a first region and a second region closer to an outer periphery of the heating part than is the first region, as viewed from a direction of a perpendicular line of the shaping surface, and the control part controls the heating part to make a temperature of the second region higher than a temperature of the first region.

According to the three-dimensional shaping device, it is possible to lower the possibility of occurrence of warpage or deformation in the shaping material deposited in the second region.

In one aspect of the three-dimensional shaping device, the heating part may include a first heating part provided at a lower side of the nozzle opening, the first heating part may heat the stage, the second region of the first heating part may be provided with a heater, and the first region of the first heating part may not be provided with a heater.

According to the three-dimensional shaping device, a temperature of the second region of the first heating part can be made higher than a temperature of the first region of the first heating part.

In one aspect of the three-dimensional shaping device, the heating part may include a second heating part provided at an upper side of a position of the nozzle opening at the time of shaping, and the second heating part may move in conjunction with the nozzle opening, and cover at least a part of the shaping surface when the nozzle opening is positioned at a center of the stage as viewed from the direction of the perpendicular line.

According to the three-dimensional shaping device, at least a part of the shaping surface can be heated by the second heating part.

In one aspect of the three-dimensional shaping device, the first region and the second region of the second heating part may be both provided with a heater, and the control part may perform control such that an output of the heater in the second region is larger than an output of the heater in the first region.

According to the three-dimensional shaping device, a temperature of the second region of the second heating part can be made higher than a temperature of the first region of the second heating part.

The one aspect of the three-dimensional shaping device may further include a temperature sensor configured to detect a temperature of the heater, and the control part may control an output of the heater based on a detection value of the temperature sensor.

According to the three-dimensional shaping device, the output of the heater can be controlled based on the temperature of the heater.

In one aspect of the three-dimensional shaping device, the heating part may include a heat insulating member, and a heater plate provided between the heat insulating member and the shaping surface, and a thickness of the heat insulating member in the second region may be larger than a thickness of the heat insulating member in the first region.

According to the three-dimensional shaping device, the temperature of the second region of the second heating part can be made higher than the temperature of the first region of the second heating part.

In one aspect of the three-dimensional shaping device, the heating part may include a heat insulating member, and a heater plate provided between the heat insulating member and the shaping surface, and thermal conductivity of the heat insulating member in the second region may be lower than thermal conductivity of the heat insulating member in the first region.

According to the three-dimensional shaping device, the temperature of the second region of the second heating part can be made higher than the temperature of the first region of the second heating part.

In one aspect of the three-dimensional shaping device, the heating part may include a first plate and a second plate, and the heater plate may be fixed by being sandwiched between the first plate and the second plate.

According to the three-dimensional shaping device, warpage of the heater due to bimetal can be reduced.

In one aspect of the three-dimensional shaping device, the heating part may include a radiant heat suppressing member configured to suppress radiant heat from the heater plate from being transferred to an opposite side with respect to the shaping surface, and the heater plate may be provided between the shaping surface and the radiant heat suppressing member.

According to the three-dimensional shaping device, it is possible to efficiently heat the shaping material deposited on the shaping surface.

What is claimed is:

1. A three-dimensional shaping device that is a pellet three-dimensional extrusion printer, the three-dimensional shaping device comprising:
   a discharge part that includes a nozzle configured to discharge a shaping material from a nozzle opening thereof;
   a stage that includes a shaping surface on which the shaping material is to be deposited;
   a first heating part disposed at a lower side of the nozzle opening and configured to heat the stage to heat the shaping material deposited on the stage, the first heating part including
   a first plate,
   a second plate, and
   a first heater that is a plate-shaped rubber heater, the first heater being disposed between the first plate and the second plate
   such that a gap is formed by the first heater, the first plate, and the second plate in a first region of the first heating part, and
   such that the first heater is disposed in a second region of the first heating part, the second region being closer to an outer periphery of the first heating part than the first region, the outer periphery of the first heating part being an outermost edge of the first heating part as viewed from a perpendicular direction perpendicular to the shaping surface; and a control part including a processor and a main storage device, electrically connected to the discharge part and the first heating part, and executing a program loaded into the main storage device to control the discharge part and the first heating part to perform a shaping-layer formation processing that includes forming a shaping layer by discharging the shaping material onto the stage, and includes making a temperature of the second region higher than a temperature of the first region.

2. The three-dimensional shaping device according to claim 1, further comprising a second heating part disposed at an upper side of a position of the nozzle opening at the time of shaping, wherein the control unit further controls the second heating part to move the second heating part in conjunction with the nozzle opening so as to cover at least a part of the shaping surface when the nozzle opening is positioned at a center of the stage as viewed from the perpendicular direction.

3. The three-dimensional shaping device according to claim 2, wherein the second heating part including a second heater that is a plate-shaped rubber heater and is disposed in both a third region of the second heating part and a fourth region of the second heating part, the fourth region being closer to an outer periphery of the second heating part than the third region, the outer periphery of the second heating part being an outermost edge of the second heating part as viewed from the perpendicular direction, and the control part controls the second heating part such that an output of the second heater in the fourth region is larger than an output of the second heater in the third region.

4. The three-dimensional shaping device according to claim 1, further comprising:

a temperature sensor configured to detect a temperature of the first heater, wherein the control part controls the first heating portion to control an output of the first heater based on a detection value of the temperature sensor.

5. The three-dimensional shaping device according to claim 1, wherein the first heater is fixed to the first plate and the second plate.

6. The three-dimensional shaping device according to claim 1, further comprising a second heating part that is disposed at an upper side of a position of the nozzle opening at the time of shaping, wherein the second heating part includes
a second heater that is a plate-shaped rubber heater, and
a radiant heat suppressing member that is configured to suppress radiant heat from the second heater from being transferred to an opposite side with respect to the shaping surface, and the second heater is disposed between the shaping surface and the radiant heat suppressing member.

* * * * *